United States Patent [19]

Wolf et al.

[11] 4,304,415
[45] Dec. 8, 1981

[54] PACKING RING FOR RIBBED CONDUITS

[75] Inventors: Franz J. Wolf; Hans J. Kunze, both of Bad Soden-Salmunster, Fed. Rep. of Germany

[73] Assignee: WOCO Franz-Josef Wolf & Co., Bad Soden-Salmunster, Fed. Rep. of Germany

[21] Appl. No.: 102,964

[22] Filed: Dec. 12, 1979

[30] Foreign Application Priority Data

Dec. 18, 1978 [DE] Fed. Rep. of Germany ....... 2854662

[51] Int. Cl.³ .............................................. F16J 15/10
[52] U.S. Cl. .................................... 277/205; 277/177; 277/207 A
[58] Field of Search ........... 277/205, 188, 207, 207 A, 277/177

[56] References Cited

U.S. PATENT DOCUMENTS

| | | | |
|---|---|---|---|
| 2,360,731 | 10/1944 | Smith | 277/177 |
| 2,893,795 | 7/1959 | Dooling | 277/177 |
| 3,347,555 | 10/1967 | Norton | 277/177 |
| 3,915,463 | 10/1975 | Pippert | 277/205 |
| 3,926,444 | 12/1975 | Gripe et al. | 277/177 |

FOREIGN PATENT DOCUMENTS

| | | | |
|---|---|---|---|
| 269542 | 11/1964 | Australia | 277/207 A |
| 782483 | 4/1968 | Canada | 277/188 |
| 419751 | 8/1966 | Switzerland | 277/177 |
| 1025704 | 4/1966 | United Kingdom | 277/207 |

*Primary Examiner*—Robert I. Smith
*Attorney, Agent, or Firm*—Burns, Doane, Swecker & Mathis

[57] ABSTRACT

A resilient packing for use in sleeve-type couplings is disclosed which has a cross-sectional shape that generally conforms to the cross section of an associated annular groove. The packing ring has a root portion which is axially narrower than the groove root diameter. At the circumference, the ring has radially protruding bead and a pair of axially protruding shoulders. The axial distance between the shoulders exceeds the axial width at the corresponding portion of the groove to axially stabilize the ring in the groove. Sides of the ring are generally spaced from corresponding adjacent side walls of the groove to accommodate axial expansion during radial compression of the ring at the time of coupling assembly. Additional opposed circumferential grooves may be provided to multiply the cross-sectional configuration and attain a seal ring suitable for comparatively wide groove.

10 Claims, 4 Drawing Figures

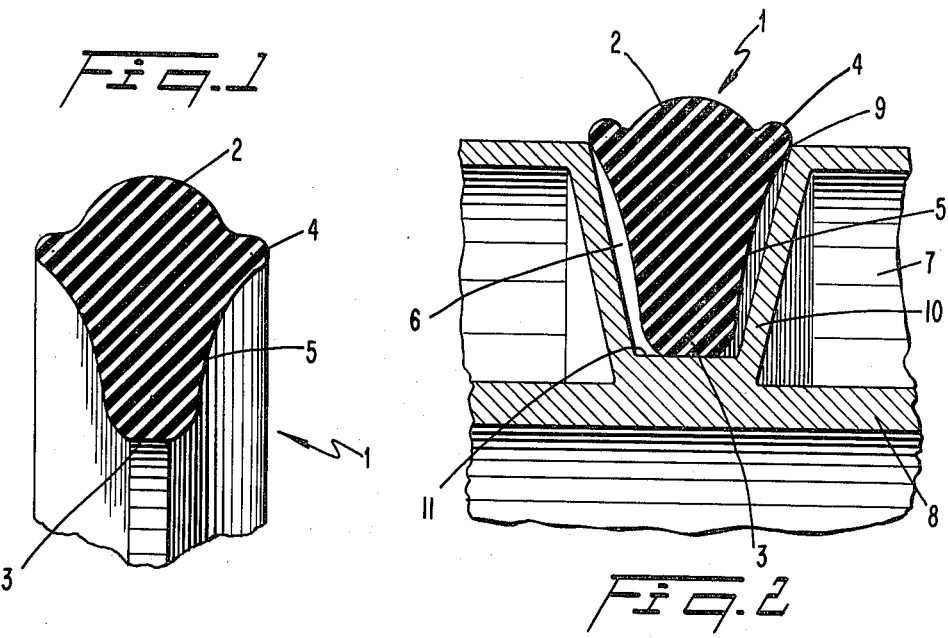
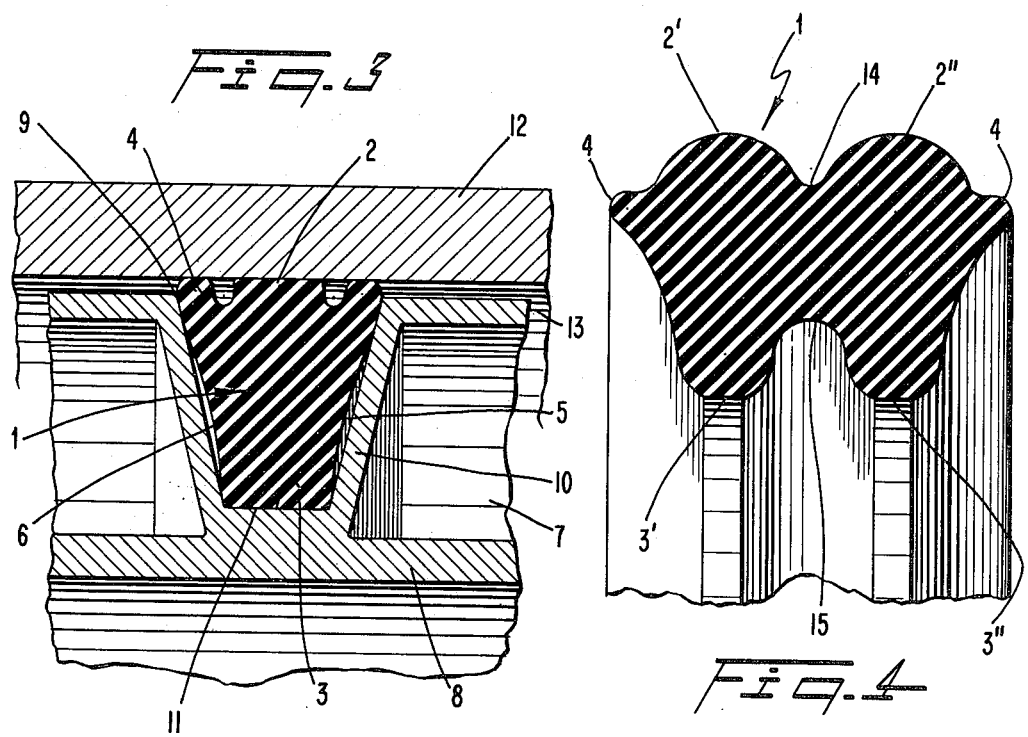

PACKING RING FOR RIBBED CONDUITS

BACKGROUND OF THE INVENTION

The invention relates generally to a packing ring for use with ribbed conduits. More specifically, the invention pertains to a packing ring of elastic material.

A ribbed conduit or tube in the context of this invention is a tube having circumferentially extending radially protruding stiffening ribs on its outer cylindrical surface in an axial equidistant sequence. For economy of both material and weight, the stiffening ribs are not solid but hollow. Depending on the minimum mechanical strength required, the ribs have thin walls. The stiffening ribs may open radially to the inside of the conduit so as to themselves form the inner circumferential surface of the tube. For example, this is the configuration of a so-called corrugated tube. In addition, the stiffening ribs may be disposed on the outside on the circumferential surface of a cylindrical tube having smooth internal walls, as in the narrow sense of ribbed tubing. Ribbed tubing of this type is made predominantly of a synthetic plastic or of metal, but other materials may also be used. Ribbed plastic tubes are used primarily in the construction industry for underground drainage pipes.

Ribbed tubing of the type discussed above is usually manufactured without integral union sockets or connecting flanges. Adjacent individual tube sections are ordinarily joined together by means of a push-on sleeve coupling having a smooth cylindrical inner surface. The sleeve coupling concentrically surrounds and overlaps pointed ends of the ribbed tubes which have front surfaces in abutment with each other. Such a connecting sleeve may be made of a synthetic plastic, metal or, in principle, any other material, including for example a ceramic.

Increasingly high sealing requirements are being specified for such tube connectors, and particularly for ribbed tubing. This is especially true for water carrying tubing used in underground installations such as in the field of sewage disposal. In accordance with the current state of the art, the sealing between the front end of a ribbed tube with a smooth inner wall of the sleeve of a tube-sleeve connection is effected by means of an annular gasket with round cross-section, a so-called O-ring. The O-ring is inserted into one groove between two adjacent ribs at the front end of the tube section. The expression "groove" in the context of the invention is thus the valley or annular depression formed between two immediately adjacent circumferential stiffening ribs of the ribbed tube, which ribs protrude radially in the outward direction.

Particularly in the case of a ribbed tube made of a plastic material, the axial cross section of a groove is essentially trapezoidally-shaped with the large base of the trapezoid corresponding to the radially outward, open side of the groove. The cross-sectional diameter of the O-ring gasket customarily used as the packing for sleeve connections is slightly smaller than the average axial width between the upper edges of the groove. The annular diameter of the O-ring gasket is typically chosen so that just over half the diameter of the gasket is drawn into the groove with a slight prestressing in the radial direction.

During the application of the sleeve while assembling a joint, the protruding part of the O-ring gasket is pressed into the groove. In the process, the major portion of the pressure generated by compressing the gasket acts essentially in the axial direction on the two flanks or side walls of the groove. The sealing of this sleeve connection thus occurs essentially between the inner wall of the sleeve and the uppermost portion of the O-ring gasket, as well as between the lateral surfaces of the O-ring gasket and the side wall surfaces of the groove, i.e., the ribs. Additional radial pressure between the upper surface of the O-ring gasket and the inner wall of the sleeve will cause only a minor increase in sealing contact between O-ring gasket and the bottom or root portion of the groove.

A disadvantage of this type of packing is the high level of axial pressure acting on the side walls of the groove or the ribs. The lateral walls of ribs are designed for radial stiffening and are not, as a rule, stiffened against an axial force in most ribbed tubes having typical hollow ribs. The stiffening ribs are thus forced apart, or deflected, by the lateral pressure of the O-ring gasket. This axial deflection may occur rapidly or gradually after extensive exposure to the lateral pressure. In all cases the latter (axial) yielding of the groove side walls leads to the reduction of the axially acting sealing forces. Specifically, due to the plastic deformation of the groove side walls and the axial deformation of the O-ring gasket caused by elimination of the lateral resistance to deformation, the already slight radial pressure component, or the equivalent radial sealing force, is decreased. As the result of the deformation forces generated by the internal pressure of the O-ring gasket acting axially on the groove sidewalls and the subsequent plastic deformation of the stiffening ribs, an appreciable reduction occurs of the limiting pressure which the sleeve connection can withstand. Conventional O-ring gaskets thus are frequently incapable of satisfying pressure tightness requirements specified in various test standards.

An initial solution of the problem is to simply increase the original cross-sectional diameter of the O-ring gasket to accommodate the internal pressure loss of the gasket caused by the plastic deformation of the ribs. But, this solution must be rejected. An O-ring gasket strengthened in this manner would hardly permit the sliding of the sleeve over the front end of the tube for two reasons: first, the force required to place the sleeve onto the tube would be excessive, and second, the O-ring gasket, which obviously would project higher above the groove, would roll out of the groove during assembly of the sliding ring and would slide off the rib surface at the tube front end. This would result in uncontrolled twisting of the O-ring gasket and altogether uncontrollable sealing conditions, both of which are intolerable in underground sewage line installations.

OBJECTS AND SUMMARY OF THE INVENTION

In view of this state of the art, it is an object of the invention to provide a packing ring for use in sleeve-type connection of ribbed tubing sections which is capable of reliably sealing such sleeve connections for long periods of time at very high pressures while requiring relatively low insertion forces for introducing the tube front end into the sleeve and while causing negligible axial loading on the ribs of the tube front end.

The foregoing object, as well as many others, is attained by using an annular elastic packing ring having a radial height greater than the depth of the associated groove to provide predetermined radial compression, a pair of axially protruding shoulders with a width exceeding the width at the top of the groove, a bottom with a diameter the same as the groove root diameter and a width less than the groove root width, and concave lateral surfaces designed to exert negligible axial stresses on the groove side walls.

The packing ring made of rubber elastic material thus has an axial cross-sectional shape adapted, at least, in its essential configuration to the profile of the groove. In the case of a trapezoidally shaped groove profile, for example, the cross-sectional shape of the packing ring is basically similar to the form of a V belt. This adaption of both groove and packing ring configurations results in a high degree of axial stabilization in the packing ring, while maintaining a state entirely free of stress.

The cross-sectional shape of the packing does not, however, conform identically to the configuration of the groove. It differs from such identical conformity essentially in three ways: (1) the cross-sectional shape of the packing ring is made slightly, but appreciably, wider than the larger axial opening of the groove in the area of the upper groove edges by means of axially protruding annular shoulders; (2) the cross-sectional shape is made concave on its essentially radial lateral surfaces so that these lateral surfaces only contact the groove sidewalls with negligible pressure under even the largest radial pressurization of the packing ring; and (3) the axial width of the bottom of the cross-sectional shape is at least slightly narrower than the axial width of the groove root, so that here again the material of the packing ring is capable of deforming without appreciable stressing the groove sidewalls in the axial direction.

In this configuration of the packing ring, it projects considerably higher in the radial plane than the radial height of the groove. The difference between the radial height of the packing ring and the radial depth of the packing ring when assembled in a coupling corresponds to the pressurization of the ring required, i.e., corresponds to sealing pressure needed. Therefore, during sliding of the sleeve over the front end of a conduit the packing ring is essentially pressed only in the radial direction between the inner wall of the sleeve and the groove root. As a result of the fact that the packing ring stressed in this manner has adequate space available within the groove for material deformation, the deformation does not generate axial stresses on lateral walls of the ribs.

The necessary axial stabilization of the packing ring is effected by axially protruding annular shoulders provided integrally on the packing ring. These annular shoulders are pressed between the upper edges of the groove during the radial compression of the packing ring. Because the ribs of a conventional ribbed tube have their greatest axial strength in this area, these ribs are not deformed by the pressure of the annular shoulders of the packing ring. Furthermore, the axial compressive forces applied by the annular shoulders pressed between the upper edges of the groove to said upper edges are negligibly small in comparison to the axial forces exerted by conventional O-rings on the rib sidewalls. Nevertheless, when these annular shoulders are pressed in this manner into the region between the upper edges of the groove, they contribute, although to a lesser extent, to the sealing function of the packing ring despite their principal function which is axial stabilization.

In this sense, it may be said that the packing ring seals essentially by means of a purely radial pressure on the packing material corresponding to compression sealing and that the packing ring is axially stabilized against so-called "floating" by stressing it between the upper edges of the groove. The sleeve connection is thus stressed exclusively in the areas of greatest stability, i.e., radially on the inner wall of the sleeve, radially on the bottom or root of the groove and to a relatively lesser degree axially between the upper edges of the groove. Because of the fact that the sealing force is applied by a practically exclusive radial pressurization of the packing ring without the axial stressing of the thin walled ribs, sleeve connections of adjacent tube sections with the packing ring of the invention retain undiminished pressure tightness even over extended periods of time.

Further, due to the adaption of the packing ring to the groove, the packing ring is readily mounted on the front end of a tube section and, because it lies deeply in the groove, it cannot be lost during assembly.

According to a further development of the invention, the radially outward surface of the packing ring, the so-called crown of the ring, is designed in the form of a bead protruding radially outwardly, i.e., as a boss ring. This primarily reduces the force required to insert the front end into the sleeve or to push the sleeve over the front end. Such an insertion force reduction is accomplished by diminishing the contact area between the packing ring and the inner wall of the sleeve to decrease resulting frictional forces. In addition, a substantially higher sealing pressure may be achieved with an equal restoring force of the elastic packing ring.

Further axial stabilization of the packing ring both during insertion of the front end into a sleeve and in a completed sleeve/tube connection may be obtained by designing the inner or bottom surface of the packing ring to be complementary to the groove root. In the case of a trapezoidally shaped groove with an essentially cylindrical root, the bottom surface is thus also cylindrical and not, for example, toroidal.

With a groove that is relatively wide in relation to its depth which requires an axially wide or radially flat packing ring, the ring is designed both on its crown and on its bottom surface with at least one annular groove so that an annular configuration resembles two individual rings joined in a radial plane. The cross-sectional shape of such a packing ring may thus be thought of as being obtained by repetition in the axial direction of the cross section described above. An annular groove extending along the center of the annular crown and a relatively deep annular groove extending outwardly from the bottom of the ring in radial opposition to the crown groove results, in a certain sense, in a duplication of the basic configuration of the packing ring. If there are two pair of these opposed annular grooves, the basic configuration would be tripled. Such repeating designs of the basic configuration are important for tubes having large nominal diameters and primarily serve both to reduce the insertion force and to improve the seal of the sleeve connection with the broad groove.

External contours of the cross-sectional shape of the packing ring preferably consist only of circular arc sections which pass or blend into each other. The only exception is a straight inner edge or bottom surface when the packing ring is designed for use with a trapezoidal groove.

BRIEF DESCRIPTION OF THE DRAWINGS

The invention will be explained in more detail hereinbelow with reference to the drawings wherein like reference numerals are applied to like elements, and wherein:

FIG. 1 is an enlarged axial cross section of a packing ring, with portions removed for clarity, according to a first embodiment;

FIG. 2 is an enlarged partial cross-sectional view of the packing ring of FIG. 1, inserted in the groove on the front end of a ribbed tube prior to application of the sleeve;

FIG. 3 is a partial cross-sectional view of the coupling of FIG. 2 after the application of the sleeve; and FIG. 4 is an enlarged partial cross-sectional view in the axial direction of a second embodiment of the packing ring.

DESCRIPTION OF THE PREFERRED EMBODIMENTS

The packing ring 1 shown in FIG. 1 has an approximately trapezoidal axial cross-sectional profile ressembling a V belt. The packing ring is intended for use in combination with a groove between two adjacent ribs of a ribbed tube or conduit. For this embodiment, the packing ring 1 is intended to cooperate with a groove that is essentially trapezoidal in axial cross section. The packing ring 1 is fabricated from an elastomer or elastic material, the composition and characteristic data whereof are determined in accordance with the requirements of the particular field of application in a known manner.

The maximum radial height of the packing ring 1, between the radially outward annular crown 2 and the radially inward ring bottom surface 3, is larger in the unstressed condition of the packing ring 1 than the radial height (or depth) of the groove, between the deepest point of the groove, i.e., the groove root, and a straight line connecting the radially outward upper edges of the groove. This radial height of the packing ring 1 is greater than the radial height of the groove by a predetermined amount which is necessary for the required radial compression of the packing ring 1, assuming free deformability of the ring in the axial direction.

The packing ring 1 has two integral annular shoulders 4 in the vicinity of the annular crown 2. Each shoulder 4 protrudes axially and in opposition to other shoulder. These annular shoulders 4 have an annular diameter at least equal to and usually slightly greater than the diameter of the radially outward upper edges of the corresponding groove. The axial width of the packing ring between the ends of the shoulders 4 is greater than the axial width of the radially uppermost groove opening, i.e., between the upper edges of the adjacent ribs. Simultaneously, the axial width of the bottom 3 of the ring is at least slightly narrower than the axial width of the groove root.

The lateral surfaces 5 of the packing ring 1 are located in essentially radial planes of the packing ring 1. Each surface curves concavely so that, with a predetermined maximum compression of the packing ring 1 and with free axial deformation, the lateral surface 5 will contact the adjacent groove sidewalls with a negligible pressure on the groove sidewalls or, preferably, will not make contact at all.

In FIG. 2, the packing ring 1 of FIG. 1 is illustrated in position in a trapezoidal groove 6, formed between two hollow ribs 7 at the front end of a ribbed tube 8. The groove 6 has two radially outward upper edges 9, and two lateral sidewalls 10 each of which extends from a corresponding upper edge 9 radially inward to a root portion 11. The root portion 11 of the groove 6 is cylindrical for a trapezoidal configuration as shown. This trapezoidal configuration of the groove 6 includes an open base directed radially outwardly between the two upper edges 9.

The internal diameter of the packing ring 1, i.e., the diameter of the bottom surface 3, is approximately equal to or slightly less than the diameter of the groove root 11. In this manner, the elastic packing ring 1 lies in the groove 1 without or at least with only a slight prestressing. The axial width of the packing ring 1 at the level of its annular shoulders 4 is slightly greater than the distance between the upper edges 9 of the groove 6. In addition, the annular radius of the protruding end of the shoulders 4 is somewhat greater then the radius of the upper edges 9, so that the annular shoulders 4 protrude somewhat radially beyond the edges 9. Between the concave sidewalls 5 of the packing ring 1 and the groove sidewalls 7, there is sufficient room to freely accommodate the axial deformation of the packing ring 1 caused by its radial compression.

In FIG. 3, the packing ring 1 is illustrated in the groove 6, with a sleeve 12 applied to complete a coupling assembly. The inner wall 13 of the sleeve 12 is smooth and generally cylindrical. The wall 13 and the groove root 11 compress the packing ring 1 radially so that the annular crown 2 engages the wall 13 and the bottom 3 of the ring 1 rests on the root 11 of the groove 6. The lateral sidewalls 5 are thus capable of freely deforming axially outward, to the extent that, even with the maximum radial deformation of the packing ring 1, the sidewalls 5 do not touch the groove sidewalls 11. The bottom portion 3 of the ring is axially deformed on the root 11 of the groove 6 and may rest slightly against the lower portion of the groove sidewalls 10. However, the packing ring does not exert an appreciable axial force on the groove sidewalls 10.

Radial compression of the packing ring 1 between the inner wall 13 of the sleeve 12 and the root 11 of the groove 6 causes the annular shoulders 4 of the packing ring 1, which protrude axially in the unstressed state, to be compressed between the upper edges 9 of the groove 6. In the process, these annular shoulders 4 bend over radially outwardly in a lip-like fashion and thus exert only a moderate axial deformation force on the upper edges 9 of the groove 6 and, therefore, also on the hollow ribs 7 of the ribbed tube 8. This axial force is accurately predetermined so that it axially immobilizes, or stabilizes, the packing ring to support it against axial floating. The support force necessary for this purpose, which may be readily determined by those skilled in the art without difficulty, is substantially lower than the sealing forces generated by the radial compression of the packing ring 1. To a lesser extent, the pressure on the groove edges 9 of the annular shoulders 4, when bent outwardly, contributes to additional sealing of the assembly.

A further embodiment of the packing ring is illustrated in FIG. 4 in a partial enlarged axial cross section. The packing ring displayed is primarily suitable for groove configurations which are axially broader and/or radially flatter than the groove profile shown in FIGS.

2 and 3. Such groove configurations are found particularly in tubes with large nominal diameters. For these applications, the packing rings preferably have cross-sectional configurations that are obtained not by simply by the widening of the embodiment of FIG. 1, but by providing at least one annular groove 14 in the annular crown extending radially inwardly and by providing at least one additional annular groove 15 in the bottom of the packing ring 1 extending radially outwardly. When as shown in FIG. 4 such annular grooves are provided in the annular crown and the bottom surface, they are preferably located in the axial center of the ring, unless otherwise required in a special application.

The additional annular groove 14 in the annular crown is preferably deep enough so that its root or bottom is located approximately on the radius of the outer side of the annular shoulder 4. This arrangement results in two annular crowns 2', 2", located symmetrically and axially adjacent to each other rather than a single annular crown 2 as shown in FIG. 1.

Similarly, the annular groove 15 formed in the bottom 3 of the ring, defines two axially adjacent bottom areas 3', 3". The annular groove 15 is made as deep as possible in order to save material. But the maximum depth is selected to not interfere with stability of the packing ring 1. Stability in this context signifies both axial stability against floating of the packing as well as radial stability required to withstand the purely radial compression of the packing ring. With respect to this radial stability, the annular groove 15 must not be deep enough or wide enough to permit the axial buckling of the ring bottoms 3', 3" under radial compressive loading.

Accordingly, with this design of the grooves 14, 15 (FIG. 4) in the annular crown and in the bottom of the ring, in a sense a doubling of the profiles is obtained when compared to axial cross-section displayed in FIG. 1. Thus, the packing ring shown in FIG. 4 may be conceived of as being formed by the axial fusion of two packing rings of the type shown in FIG. 1. In the case of even wider grooves, repeated duplication of the axial cross section, specifically tripling or quadrupling, may be considered, so that the packing ring assumes a configuration of a strip like packing element.

A decisive factor in such duplication of the axial profiles is, however, the need to consistently maintain purely radial compressibility of the packing ring between the opposed annular crowns 2' and ring bottoms 3'. Even in configurations where the overall axial cross section is flatter than with the embodiment of FIG. 1, the packing ring must retain the behavior of a sequence or chain of individual purely radial compression packings.

Advantages of designing the packing ring as shown in FIG. 4 for wide grooves in the case of large nominal tube diameters rather than proportionally broadening a packing ring of the type shown in FIG. 1 are that material is saved, high sealing pressures are retained and, the force necessary to apply the sleeve is barely increased.

The design of the packing ring in FIG. 4 as a double ring for a groove with a cylindrical root, preferably includes a strictly cylindrical configuration of the two inner surfaces 3' and 3" of the ring bottom. In this fashion, the inner surfaces rest smoothly and flush on the groove root without axial buckling during the radial compression of the ring. In the process, the ring bottom groove 15, provided between the two ring bottoms 3' and 3", freely accomodates axial deformation of the two ring bottom area 3', 3". This leads further symmetry of the radial compression forces, to an enlargement of the contact surface on the groove root and to stabilization of the purely radial compression components.

It will now be apparent that an improved packing ring and seal assembly has been disclosed which satisfies the objects, provides the advantages and overcomes the problems set forth above. Moreover, it will be apparent to those skilled in the art that numerous modifications, variations substitutions and equivalents exist for the various features of the invention. Accordingly, it is expressly intended that all such modifications, variations, substitutions and equivalents which fall within the spirit and scope of the invention as defined in the appended claims be embraced thereby.

What is claimed is:

1. A static sealing arrangement consisting of a packing ring, a coupling sleeve and a conduit, the conduit having a surface groove with a predetermined axial width between edges at a predetermined surface diameter, a predetermined radial depth and a root of predetermined axial width and predetermined root diameter, the coupling sleeve having an inside surface diameter slightly greater than said predetermined surface diameter, the packing ring comprising:

an annular ring of elastic material including a crown portion having a diameter greater than both the predetermined surface diameter and the inside surface diameter of the coupling sleeve in a free state to provide a predetermined radial compression when the sleeve is positioned around the conduit, a pair of axially protruding shoulders, each shoulder being on a corresponding side of the ring, said shoulders being at an annular diameter at least as large as the predetermined surface diameter, the axial width of the ring including the shoulders in a free state being greater than the predetermined axial surface width, said shoulders deforming radially outwardly upon assembly to form an annular sealing surface against the inside of the coupling sleeve on each side of said crown portion, a bottom surface having an axial width less than the predetermined axial root width, and a diameter corresponding to the predetermined root diameter, and a pair of concave lateral surfaces, each lateral surface extending between a corresponding one of the shoulders and the bottom surface and being operable to exert a negligible axial stress on the groove when the ring is subjected to radial pressure by the sleeve.

2. The sealing arrangement of claim 1 wherein the crown portion protrudes radially outwardly and is configured as an annular bead with a rounded shape.

3. The sealing arrangement of claim 1 wherein the bottom surface has an axial configuration complementary to the groove root axial profile.

4. The sealing arrangement of claim 1, 2, or 3 including at least one annular groove in the crown portion.

5. The sealing arrangement of claim 1, 2, or 3 including at least one annular groove in the bottom surface.

6. The sealing arrangement of claim 1, 2, or 3 wherein the crown portion, the shoulders, and the lateral surfaces of the axial cross section of the ring are defined by a plurality of circular arc sections passing into each other.

7. A packing ring for use in connection between a coupling sleeve and a conduit, the packing ring having an axial cross section comprising:

a crown portion protruding radially outwardly in a radial plane and having a convex arcuate shape;

a bottom portion protruding radially inwardly in the radial plane being in general radial alignment with the crown portion and having an axially extending inner edge portion which is part of a cylindrical inner surface of the ring;

a pair of axially protruding shoulders, each shoulder being on a corresponding side of the radial plane and extending away from the radial plane, each shoulder being positioned nearer to the crown portion than to the inner edge of the bottom portion, each shoulder being in axial alignment with the opposed shoulder, and being connected to the crown portion by at least one concave edge surface; and a pair of concave sidewalls, eachh extending in a generally radial fashion between the bottom portion and a corresponding one of the shoulders, each sidewall having a lower curvature than that of the concave edge surface so that, in use, radial compression between the crown portion and the bottom portion is relieved by axial expansion of the sidewalls and radially outward deflection of the shoulders.

8. The packing ring of claim 7, including at least one annular groove in the crown portion.

9. The packing ring of claim 7, including at least one annular groove in the cylindrical inner surface of the ring.

10. The packing ring of claim 7, wherein the crown portion, the shoulders, and the sidewalls of an axial cross section of the ring are defined by a plurality of circular arc sections passing into each other.

* * * * *